United States Patent Office 2,834,371
Patented May 13, 1958

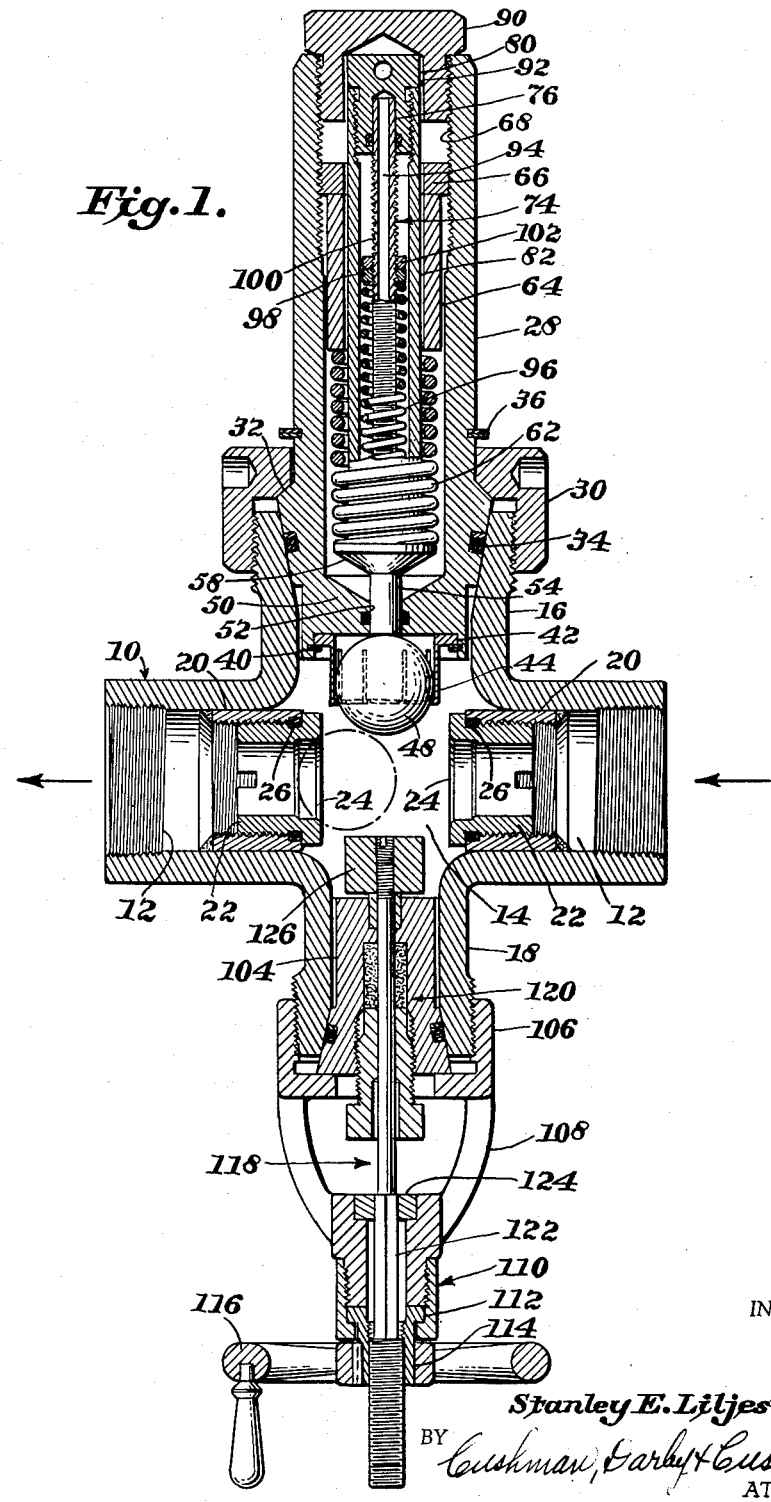

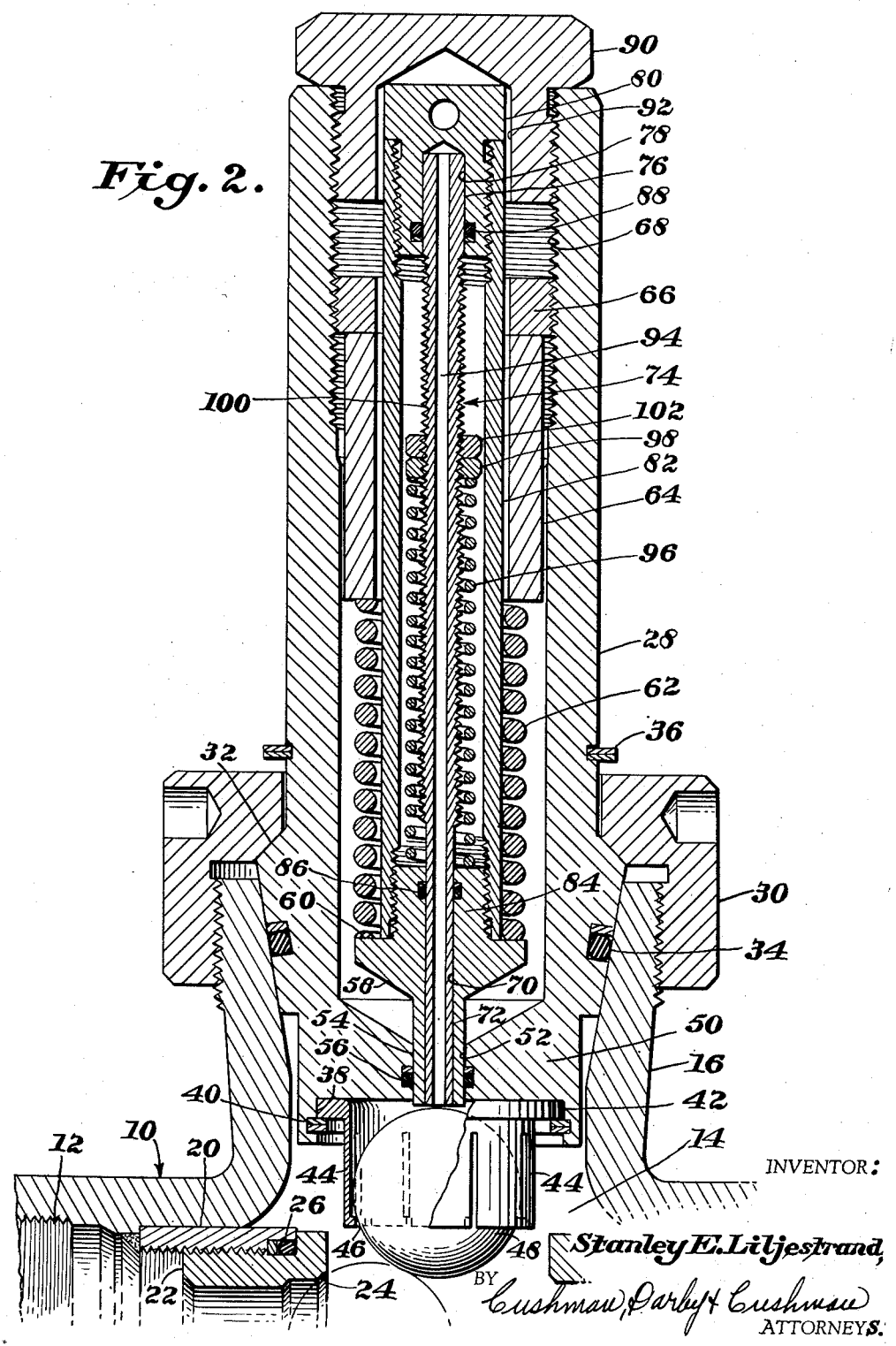

2,834,371

AUTOMATIC SHUT-OFF VALVE

Stanley E. Liljestrand, Houston, Tex., assignor, by mesne assignments, to U. S. Industries, Inc., a corporation of Delaware Application January 4, 1954, Serial No. 401,940

17 Claims. (Cl. 137—458)

This invention relates to automatic valves adapted to be connected into a flow line and automatically operable by pressures therein above predetermined high and/or below predetermined low limits to shut off flow through the line.

Automatic shut-off valves of this type are known in the art, but such valves presently in use are susceptible of operating difficulties. For example, in one known valve of this type, fluid is vented to the atmosphere on shut-off operation of the valve, so that in the event the fluid being controlled is high-pressure gas, its expansion at the vent may possibly freeze the valve mechanism. Further, other existing valves of this nature are constructed so that foreign material in the controlled fluid can be trapped in the moving parts of the valve and possibly clog the same sufficiently to render the valve inoperative. Sand and paraffin are particular examples of valve-clogging foreign materials frequently encountered in oil field usage.

In some existing valves of this type, means are provided for positively forcing or projecting a valve member into the path of flow through the valve for engagement with a seat therein. Present shut-off valves of this nature are relatively complicated in construction, however, with resulting increased costs of manufacture. In addition to the foregoing, most automatic shut-off valves are not subject to ready adjustability and adaptability to wide ranges of valve-operating high and/or low pressure limits.

Accordingly, it is an object of this invention to provide an improved automatic shut-off valve which is leak-proof and does not vent any of the controlled fluid to atmosphere.

It is another object of this invention to provide an automatic shut-off valve with improved operating mechanism that will not become clogged by foreign material in the fluid being controlled.

It is another object of this invention to provide an automatic shut-off valve that is readily adjustable and adaptable to wide ranges of high and/or low valve-operating pressure limits.

It is another object of this invention to provide an improved automatic shut-off valve which meets the foregoing objects and in which the valve member is positively forced into the path of flow through the valve to assure engagement with a valve seat therein.

It is a further object of this invention to provide an improved automatic shut-off valve that is relatively simple in design, with consequent manufacturing economies, yet is most effective for its intended functions.

Other objects and advantages of the invention will become apparent from the following description and accompanying drawings, in wihch:

Figure 1 is a vertical sectional view of an automatic shut-off valve embodying this invention.

Figure 2 is an enlarged fragmentary sectional view of the operating mechanism of the shut-off valve shown in Figure 1.

Referring now to the drawings, the shut-off valve shown therein includes a valve housing 10 in the form of a cross-shaped fitting having aligned flow ports 12 opening to an interior valve chamber 14 disposed between the lateral arms 16 and 18 of the fitting. The ports 12 are interiorly threaded for connection into a flow line, and secured within the inner end of each port, as by welding, is a cylindrical interiorly-thread short pipe section 20 having a seat ring 22 threadedly engaged therewith and presenting an annular valve seat 24 to the valve chamber 14. Preferably, an O-ring seal 26 is interposed between each pipe section 20 and its corresponding seat ring 22.

The interior of the lateral arm 16 of the fitting 10 flares outwardly at its outer end for the reception of a complementary conical surface on a hollow casing 28 which contains the control mechanism of the valve. The casing 28 is secured in place by a coupling ring 30 threaded onto the arm 16 and engaging a shoulder 32 on the casing. Preferably, a circumferential packing groove having an O-ring 34 therein is interposed between the engaged surfaces of the casing 28 and the arm 16 to provide a seal therebetween. A spring ring 36 engages a circumferential groove on the casing 28 outwardly of the coupling ring 30 to retain the latter on the casing on removal thereof from the valve fitting 10.

Disposed within a cylindrical recess 38 at the inner end of the casing 28, and retained therein by a spring ring 40, is a valve-retaining ring or holder 42 having a plurality of depending resilient fingers 44, each provided with an inwardly-extending slight projection 46 at the lower end thereof. Releasably retained within the holder 42 by the resiliency of the fingers 44 is a ball 48 disposed in laterally-spaced relation to the valve seats 24 out of the direct path of flow through the chamber 14 between the ports 12.

From the structure thus far described, it will be seen that if the ball 48 is forced from the holder 42 into the direct path of flow through the valve, such flow will carry the ball into sealing engagement with one or the other of the valve seats 24, i. e., the valve seat disposed on the downstream side of the line, as shown in dotted lines in Figure 1.

The inner and end wall 50 of the casing 28 is provided with a bore 52 of less diameter than the casing interior and which opens to the valve chamber 14 coaxially of the valve holder 42. Slidably disposed within the bore 52 is a piston 54 having a flat inner end exposed to the valve chamber 14. An O-ring 56 disposed in a circumferential packing groove in the walls of the bore 52 provides a tight seal for the piston 54 to prevent leakage of fluid from the valve chamber 14 into the interior of the casing 28. The piston 54 projects into the casing interior and is enlarged therein to form a shoulder 58 complementary to the inner surface of the end wall 50 of the casing 28 for limiting movement of the piston inwardly of the valve chamber 14, as will be later explained. Beyond the shoulder 58, the piston 54 is reduced to form an outwardly-facing shoulder 60 which engages one end of a coil compression spring 62 having the other end thereof engaged with a sleeve 64 which rests against a tubular plug 66 threadedly engaged with interior threads 68 on the casing 28.

The piston 54 is provided with a coaxial cylinder bore 70, and slidably disposed therein is a reduced inner section 72 of a differential piston 74 which extends outwardly beyond the bore 70 and has an enlarged outer section 76 slidably disposed in a complementary cylinder recess 78 in the inner end of a plug-like cap 80 threadedly engaged within and closing the outer end of a tubular extension or shell 82 on the piston 54 that is threadedly engaged with an outwardly-extending boss 84 on the latter. A circumferential packing groove is provided in the side walls of the piston bore 70 and has an O-ring 86 therein to provide a tight seal between the inner section 72 of the differential piston 74 and the bore 70, while a circumferential packing groove is provided in the side walls of the recess 78 and has an O-ring 88 therein to provide a tight seal between the enlarged outer section 76 of the differential piston and the recess. The bottom of the cap recess 78 provides a stop for limiting outward movement of the differential piston 74 relative to the piston 54. The outer end of the casing 28 is closed by a plug-like cap 90 threadedly engaged with the interior threads 68 on the casing and having a central recess 92 in its inner face for reception of the piston shell 82 and plug-like cap 80 thereon. The bottom of the recess 92 serves as a stop for limiting outward movement of the piston 54 relative to the casing 28.

The differential piston 74 has an axial through bore 94 of uniform diameter, so that pressure in the valve chamber 14 is communicated to the outer end of the differential piston. It thus will be seen that, since the outer end of the piston 74 is of greater area than the inner end thereof, fluid pressure in the chamber 14 constantly urges the differential piston 74 inwardly thereof. A coil compression spring 96 has one end thereof bearing against the outer face of the piston boss 84 and the other end thereof bearing against a compression-adjustment nut 98 engaged with a threaded intermediate portion 100 of the differential piston 74 within the piston shell 82. Hence, the spring 96 constantly urges the differential piston 74 in an outward direction relative to the piston 54. Preferably, a lock nut 102 is engaged with the adjustment nut 98 to secure the latter in a predetermined adjusted position.

From the construction described, it will be seen that fluid pressure in the valve chamber 14 is effective on an area of the piston 54 equal to the area of the bore 52 to urge the piston 54 in an outward direction until stopped by engagement of the cap 80 with the cap 90. At its outermost position of movement, the inner end of the piston 54 is disposed in spaced adjacency to the ball 48. The spring 62 constantly urges the piston 54 inwardly of the valve chamber 14, so that when the spring force is not balanced or overcome by a corresponding pressure force effective on the piston 54, the spring 62 positively moves the piston inwardly of the valve chamber 14 and into engagement with the ball 48 to force the latter out of the valve holder 42 and into the direct path of flow between the housing ports 12. Such flow will move the ball 48 into sealing engagement with the downstream seat 24, as is shown in dotted lines in Figure 1. In other words, at pressures below a predetermined valve chamber pressure, the spring 62 is effective to close the valve.

The spring 96 constantly urges the differential piston 74 outwardly of the valve chamber 14 until stopped by engagement with the bottom of the recess 78. In this position of the differential piston 74, the inner end face thereof is substantially flush with the inner end face of the piston 54, as is best shown in Figure 2. Since the outer end face of the differential piston 74 is of greater area than the inner end face thereof, pressure in the valve chamber 14 is effective on the differential area between these faces to constantly urge the differential piston 74 inwardly of the valve chamber 14 into projecting engagement with the ball 48. Consequently, when the pressure force acting on the differential piston 74 is sufficient to overcome the spring 96, the ball 48 will be projected out of the valve holder 42 by the differential piston 74 and carried into sealing engagement with the downstream valve seat 24 by the flow of fluid through the valve. In other words, when the valve chamber pressure exceeds a predetermined high pressure, the valve is automatically closed.

The predetermined high and low pressure limits between which the valve will not operate to shut off flow therethrough can be adjusted by adjusting the adjustment nut 98 and the threaded plug 66, respectively. Also, since a single spring usually is incapable of providing a wide enough range of predetermined high or low pressure limits, the springs 62 and 96 can easily be replaced by stronger or weaker springs. Additionally, it will be seen that, by omitting the spring 62, the automatic shut-off valve will operate only at a predetermined high pressure, or by omitting the differential piston 74 and its spring 96, the valve will operate only at a predetermined low pressure. In the latter event, a seal should be provided between the cap 80 and the shell 82 or the differential piston 74 replaced by a solid piston of like exterior dimensions.

The interior of the lateral arm 18 of the valve fitting flares outwardly at its outer end for the reception of a complementary conical surface on a bushing member 104 that is secured in place by a coupling nut 106 engaged with exterior threads on the lateral arm 18. The nut 106 is provided with a yoke 108 that supports a thrust bearing 110 engaged with a thrust collar 112 on a feed nut 114, the latter being rotated by a handwheel 116 keyed thereto. A rod 118 having its outer end threadedly engaged with the feed nut 114 extends through the thrust bearing 110, through a stuffing box 120 in the bushing member 104, and into the valve chamber 14. A portion 122 of the rod 118 adjacent the threads thereon is squared or of other non-circular configuration for engagement with complementary inner surfaces on a non-rotating member 124 surrounding the rod and secured to the thrust bearing 110, so that the rod is restrained against rotation and will feed and retract upon rotation of the handwheel 116. Threaded onto the inner end of the rod 118 which projects into the valve chamber 114 is a reset knob or disc 126 of substantially the same diameter as the ball 48.

When the valve is set in operation in a line, the reset rod 118 and its reset knob 126 are in the position shown in Figure 1 of the drawings, wherein the knob 126 is out of the direct path of flow between the valve ports 12. Once a predetermined high or low pressure has operated the valve, however, so that the ball 48 is seated against one or the other of the valve seats 24, the pressure on both sides of the valve may be equalized, by means known in the art, and the handwheel 116 rotated to engage the reset knob 126 with the ball 48 and force the latter off its seat and back into the holder 42. At the same time that the pressure is equalized on the opposite sides of the valve, the operating pressure of the line in which the shut-off valve is connected is reestablished within the predetermined high and low valve-operating pressure limits, so that both pistons 54 and 74 are retracted outwardly out of the valve chamber 14 and the ball 48 will be retained within the holder 42.

It thus will be seen that the objects of this invention have been fully and effectively accomplished. It will be realized, however, that the specific embodiment described and shown for the purpose of illustrating the principles of the invention is subject to change without departure from such principles. Therefore, this invention includes all modifications encompassed within the spirit and scope of the following claims.

I claim:
1. An automatic shut-off valve for a flow line comprising: a housing adapted to be connected into a flow line and having a flow passage therethrough; a valve seat in said housing about said passage; a valve member cooperable with said seat for shutting off flow through said passage; means defining a space in said housing disposed laterally of said seat for accommodating said valve member, said valve member normally being disposed in said space in laterally-spaced relation to said seat out of the direct path of flow in said passage; first spring-biased piston means mounted in said housing and responsive to pressure in said passage below a predetermined low pressure for engaging and projecting said valve member into said flow path for engagement with said seat; and second spring-biased piston means mounted in said housing and responsive to pressure in said passage above a predetermined high pressure for engaging and projecting said valve member into said flow path for engagement with said seat.

2. The structure defined in claim 1 wherein said first and second piston means are coaxial.

3. The structure defined in claim 1 wherein the second piston means includes a differential piston having both ends thereof exposed to passage pressure.

4. The structure defined in claim 1 including yieldable means for retaining the valve member in the normal disposition thereof.

5. The structure defined in claim 4 including means operable from the exterior of the housing for engaging and moving the valve member from the seat, when engaged therewith, into retaining engagement with the yieldable means.

6. An automatic shut-off valve for a flow line comprising: a housing adapted to be connected into a flow line and having an interior valve chamber provided with an inlet port and an outlet port; a valve seat on the inner end of said outlet port; a valve member in said chamber cooperable with said seat for shutting off flow through the valve; means defining a space in said chamber disposed laterally of said seat for accommodating said valve member, said valve member normally being positioned in said space in laterally-spaced relation to said seat out of the direct path of flow into said outlet port; piston means disconnected from said valve member, exposed to pressure in said chamber, and urged by said pressure to move into engagement with and project said valve member into said direct path of flow for engagement with said seat; and spring means for urging said piston means away from said valve member and effective below a predetermined high chamber pressure to restrain said piston means against movement.

7. The structure defined in claim 6 in which the piston means includes a differential piston having both ends thereof exposed to chamber pressure.

8. The structure defined in claim 7 in which the piston means includes a piston-mounting cylinder extending outwardly of the valve chamber and having a closed outer end, and the piston has a duct therethrough for communicating chamber pressure to the outer end of said piston.

9. An automatic shut-off valve for a flow line comprising: a housing adapted to be connected into a flow line and having a flow passage therethrough and cylinder means extending laterally of said passage; a valve seat in said housing about said passage; a valve member cooperable with said seat for shutting off flow through said passage; means defining a space in said housing disposed laterally of said seat adjacent the inner end of said cylinder means for accommodating said valve member, said valve member being normally disposed in said space adjacent the inner end of said cylinder means out of the direct path of flow in said passage; differential piston means disconnected from said valve member in said cylinder means responsive to pressure in said passage for projecting said valve member into said direct path of flow for engagement with said seat; and spring means restraining said piston means against projecting movement below a predetermined high passage pressure.

10. The structure defined in claim 9 including duct means in said piston means for communicating passage pressure to the outer end of said piston means.

11. An automatic shut-off valve for a flow line comprising: a housing adapted to be connected into a flow line and having an interior valve chamber provided with an inlet port and an outlet port; a valve seat on the inner end of said outlet port; a valve member in said chamber cooperable with said seat for shutting off flow through the valve; means defining a space in said chamber disposed laterally of said seat for accommodating said valve member, said valve member normally being positioned in said space in laterally-spaced relation to said seat out of the direct path of flow into said outlet port; first piston means urged by pressure in said chamber to move into engagement with and project said valve member into said direct path of flow for engagement with said valve seat; spring means for urging said first piston means away from said valve member and effective below a predetermined high chamber pressure to restrain said first piston means against movement by passage pressure; second piston means urged by chamber pressure away from said valve member; and second spring means for urging said second piston means into projecting engagement with said valve member and effective below a predetermined low chamber pressure to project said valve member into said direct path of flow for engagement with said seat.

12. An automatic shut-off valve for a flow line comprising: a housing adapted to be connected into a flow line and having a flow passage therethrough and a cylinder extending laterally of said passage; a valve seat in said housing about said passage; a valve member cooperable with said seat for shutting off flow through said passage; means defining a space in said housing disposed laterally of said seat adjacent the inner end of said cylinder for accommodating said valve member, said valve member being normally disposed in said space adjacent the inner end of said cylinder out of the direct path of flow in said passage; a piston in said cylinder urged outwardly of said passage by pressure therein; spring means for urging said piston inwardly of said passage and effective below a predetermined low passage pressure to move said piston against said valve member and project the latter into the direct path of flow in said passage for engagement with said seat; a second cylinder within said piston; a differential piston within said second cylinder and urged inwardly of said passage by pressure therein to project said valve member into the direct path of flow in said passage for engagement with said seat; and second spring means urging said differential piston outwardly of said passage and effective below a predetermined high passage pressure to restrain said differential piston against movement by passage pressure.

13. An automatic shut-off valve for a flow line comprising: a housing adapted to be connected into a flow line and having an interior valve chamber provided with an inlet port and an outlet port; a valve seat on the inner end of said outlet port; means defining a bore extending outwardly of said chamber laterally of said seat; means defining a space in said chamber disposed laterally of said seat adjacent the inner end of said bore; a valve member normally disposed in said space adjacent the inner end of said bore out of the direct path of flow into said outlet; a hollow piston in said bore urged outwardly of said chamber by pressure therewithin; stop means outside said chamber for limiting outward movement of said piston; spring means outside said chamber for urging said piston inwardly thereof and effective below a predetermined chamber pressure to move said piston into engagement with said valve member and project the latter into said direct path of flow for engagement with said seat; means defining a differential cylinder coaxially within said piston, the smaller end of said cylinder opening to said chamber; a differential piston in said cylinder; a longitudinal through bore in said differential piston for communicating chamber pressure to the outer end thereof, said pressure being effective to urge said differential piston into projecting engagement with said valve member; spring means within said piston for urging said differential piston outwardly of said chamber and effective below a predetermined chamber pressure to restrain said differential piston against inward projecting movement; and stop means within said piston for limiting outward movement of said differential piston.

14. The structure defined in claim 13 including a hollow casing on the housing enclosing the hollow piston and its spring means, and a removable closure for the outer end of said casing.

15. The structure defined in claim 13 including a removable closure for the outer end of the hollow piston constituting the stop means for the differential piston.

16. The structure defined in claim 13 including means yieldingly retaining the valve member adjacent the inner end of the bore.

17. The structure defined in claim 13 including a hollow casing detachably secured to the housing and enclosing the bore, both pistons, and both spring means.

References Cited in the file of this patent

UNITED STATES PATENTS

| | | |
|---|---|---|
| 894,102 | Banjock | July 21, 1908 |
| 1,237,922 | Lucas | Aug. 21, 1917 |
| 1,337,248 | Mann | Apr. 20, 1920 |
| 1,923,810 | Bergdoll | Aug. 22, 1933 |
| 2,635,626 | Meynig | Apr. 21, 1953 |
| 2,667,890 | Meynig | Feb. 2, 1954 |
| 2,749,926 | Dillman | June 12, 1956 |

FOREIGN PATENTS

| | | |
|---|---|---|
| 25,206 | Great Britain | June 23, 1910 |